United States Patent

Hanashima et al.

[11] Patent Number: 5,997,007
[45] Date of Patent: Dec. 7, 1999

[54] SPIRAL WOUND TYPE GASKET

[75] Inventors: Kanji Hanashima; Mitsuyuki Nakano; Shigeru Morita, all of Yokohama, Japan

[73] Assignee: Nichias Corporation, Tokyo, Japan

[21] Appl. No.: 08/963,819

[22] Filed: Nov. 4, 1997

[30] Foreign Application Priority Data

Nov. 5, 1996 [JP] Japan ................................... 8-308729

[51] Int. Cl.⁶ .................................................. F16J 15/12
[52] U.S. Cl. ............................................................ 277/610
[58] Field of Search ................................... 277/610, 633

[56] References Cited

U.S. PATENT DOCUMENTS 5,609,344  3/1997  Tamaoki et al. .

FOREIGN PATENT DOCUMENTS 3-93654  9/1991  Japan .
4-73470  3/1992  Japan .

*Primary Examiner*—Chuck Y. Mah
*Assistant Examiner*—Alison K. Pickard
*Attorney, Agent, or Firm*—Flynn, Thiel, Boutell & Tanis, P.C.

[57] ABSTRACT

In order to provide a spiral wound type gasket, in which centering of the gasket body is easy and a good sealing property at a low superficial pressure can be obtained, the spiral wound type gasket is constructed by winding a metal hoop member having an approximately V-shaped cross section and a filler member in a spiral, superposed on each other. In this gasket, an extremity bent portion of the V shape of the hoop member is directed towards the inner peripheral side and in this way it is possible to obtain a good centering and to prevent bulge-out of the filler member towards the interior of the pipe.

15 Claims, 2 Drawing Sheets

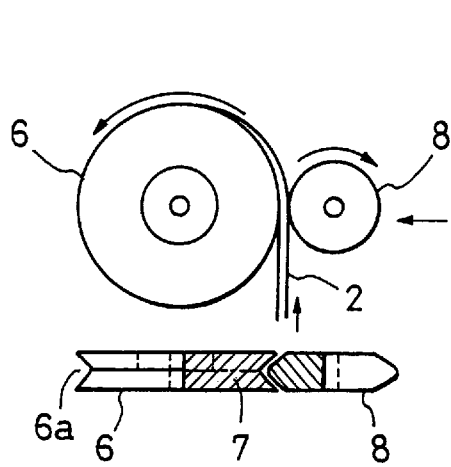
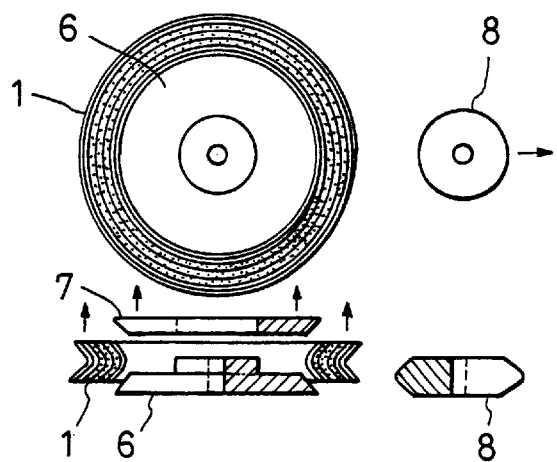
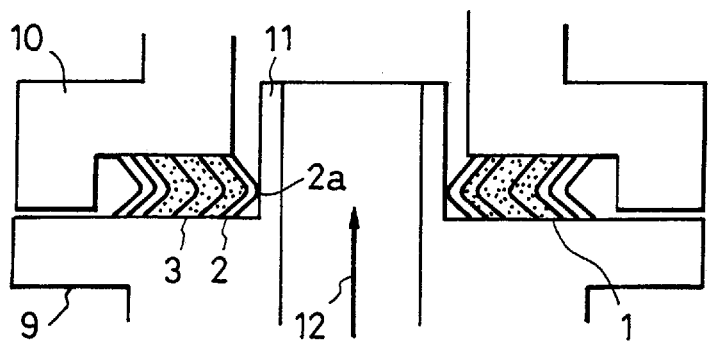
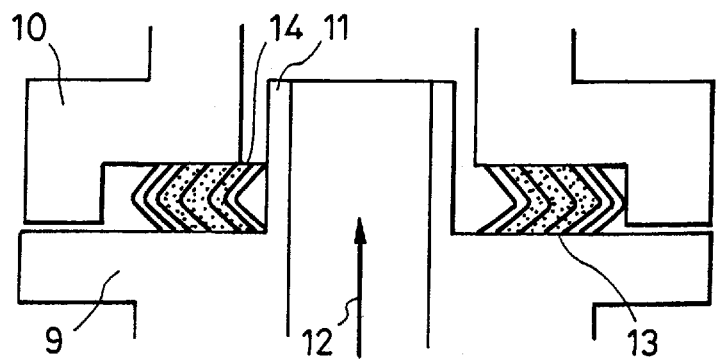

SPIRAL WOUND TYPE GASKET

FIELD OF THE INVENTION

The present invention relates to a spiral wound type gasket used in a joint portion for an apparatus or a piping at high temperatures and high pressures for the purpose of sealing it with respect to a fluid such as water, oil, vapor, gas, etc. The spiral wound type gasket includes a single tape-shaped and undulated metal thin plate (hereinbelow called hoop) and a tape-shaped filling material made of asbestos, flexible graphite, etc. (hereinbelow called filler) are wound several times in a spiral wound form in a state where they are superposed on each other. Thus a spiral wound type gasket can be constructed for use as a flange joint having an insertion type construction useful as a part in an exhaust system for an automobile.

DESCRIPTION OF THE PRIOR ART

A spiral wound type gasket has a construction, in which a tape-shaped metal hoop formed beforehand in an approximate V shape in cross section is wound, putting filler such as an asbestos tape, etc. between adjacent plies thereof, so that the extremity of the V shape is directed towards the outerperipheral side. This construction being called a fundamental form. Apart thereof, there are known various types of gaskets, such as gaskets with an inner ring, gaskets with an outer ring, gaskets with an inner and an outer ring, in which a (or two) reinforcing metal ring(s) is added on the inner side, on the outer side, and on both the inner and outer sides, respectively, of the gasket body. The purpose of the rings is preventing deformation of the gasket body due to fastening with pressure and centering thereof. Owing to the construction, in which the metal hoop and the filler having a cushioning property are wound so that they are superposed alternately, these types of spiral wound type gaskets have a good elasticity and can deal with thermal expansion and contraction. Therefore, the gaskets have an excellent sealing property and it is thought that they are ideal gaskets for high temperatures. Thus, they were widely known as gaskets used in joint portions for parts in an exhaust system such as an exhaust manifold, a front tube, or a muffler for an automobile.

As a kind of filler, heretofore an asbestos tape obtained by slitting a sheet of asbestos paper into bands was generally used. However, asbestos fiber is a natural mineral and its resources may be exhausted. Health troubles presumably caused by asbestos fiber have been a problem and there has been a worldwide trend to restrict the use of asbestos. At present, tapes are obtained by slitting a sheet of non-asbestos paper principally made of inorganic fiber other than asbestos (hereinbelow called NA tape).

For this NA tape, various kinds of inorganic fibers (other than asbestos) and a needle or scale-shaped filler are combined and fastened by means of a binder. However most of these fibers have greater fiber diameters and are rigid and there is no entanglement between different inorganic fibers with respect to asbestos fibers having small fiber diameters in a fibril state. For this reason, when a spiral wound type gasket using this NA tape as filler is exposed directly to high temperature gas and binder, the NA tape is completely decomposed. This can give rise to a problem that the filler falls off easily due to vibration, etc.

In general, in a joint portion of a part in an exhaust system for an automobile, in order to improve workability when two flanges are joined, as indicated in FIG. 6. An in-row portion 11 is formed, in which a flange of an upstream side exhaustion pipe, in which exhaust gas 12 flows, protrudes, and this in-row portion 11 is inserted into an exhaust pipe, to which a downstream side flange 10 is welded. A spiral wound type gasket 13 is inserted into the in-row portion 11 to seal the interstice between the up- and downstream side flanges 9 and 10. At this time, in order to improve workability when the gasket body 13 is mounted in the in-row portion 11 or when the flanges are joined, the size thereof is determined so as to be greater than the outer diameter of the exhaustion pipe of the in-row portion and smaller than the inner diameter of the flange portion. Consequently, the center of the gasket 13 can be displaced from the center of the exhaust pipe, as indicated in FIG. 6, and the gasket 13 can be mounted so that the filler portion 14 thereof can be exposed directly to exhaust gas. In such a case, there was no important problem when a conventional asbestos tape was used as filler. However, since binding force between particles of inorganic material is weak in the NA tape, when the binder is thermally decomposed and easily removed due to vibration, etc. Therefore, there was a drawback that the sealing property was worsened in a short period of time.

In order to deal therewith, it was thought that the inner diameter of the gasket 13 could be determined so as to be approximately equal to the outer diameter of the exhaustion pipe of the in-row portion 11 and an idly wound portion consisting only of hoops without filler on the inner side was increased so that the filler 14 was not exposed directly to exhaust gas. However this gave rise to an inconvenience that, in addition to the fact that, since the hoop portion made of metal increased, an amount of compression at a low superficial pressure became smaller and the fabrication cost rose. Further, the two end portions of the approximately V-shaped hoop easily caught the exhaust pipe, when inserted and thus it was difficult to set the gasket.

It was also thought of to use a gasket with an inner ring, having a reinforcing metal ring mounted on the inner side of the gasket body. However this gave rise to problems that, since weight of the whole gasket increased, this followed the reverse course against effort to decrease weight and the fabrication cost increased, because a punched or cut-out metal ring was used.

As another known prior art method a ring-shaped body for centering is disposed on the inner side of a spiral wound type gasket body in one body (cf. JP Utility Model-A-Hei 3-93654). However, this method, where the ring-shaped body was mounted after formation of the main body, the number of steps increased and mounting work was complicated. In the case where the ring-shaped body was produced continuously as a deformation of the shape of the hoop for the main body, two kinds of rolls used for bending work for the hoop were necessary, either of which caused increased costs.

In another method, there were spiral wound type gaskets, in which a polygonal guide was mounted on the inner or outer side of each of gasket bodies (cf. JP-A-Hei 4-73470). By this method, since two kinds of rolls for bending work of the hoop and for cutting-off both the sides were necessary or since an auxiliary core was required between the polygonal body and the main body, increased costs were unavoidable.

No flanges having a high rigidity nor thick fastening screws were used in a spiral wound type gasket used in a part of an exhaust system for an automobile to decrease weight of the automobile, therefore it was desired to provide a spiral wound type gasket having a great amount of compression at a low superficial pressure and a good fitness to flange surfaces with respect to those used for general purposes.

SUMMARY OF THE INVENTION

The present invention has been made in view of the above described points and an object thereof is to provide a spiral wound type gasket, for which centering of the gasket body can be effected easily without raising fabrication cost and which has a good sealing property at a low superficial pressure.

In order to achieve the above object, the present invention is a spiral wound type gasket, in which a metal hoop member having an approximate V shape in cross section and a filler member are wound in a spiral while superposing them on each other. An extremity bent portion of the V shape of the hoop member is directed inward and has an angle α of between 30° and 90°. The angle α is more preferably between 30° and 60° and the extremity bent portion preferably has a radius of curvature comprised between 0.4 mm and 1.3 mm.

Further, when the hoop member is wound with the extremity of the approximate V shape thereof directed inward, the hoop member is thrust to a winding die having a cross section with a groove having the same shape as the approximate V shape along the periphery thereof by means of a thrusting piece. The winding die is constructed so that it can be divided into two parts in the thickness direction to be dismounted. The hoop member is fabricated in this way only by changing slightly an already existing equipment without changing productivity. Therefore, it is possible to overcome large start-up costs.

Although an NA tape or an flexible graphite tape is suitable as a kind of filler member, the NA tape is preferable from the point of view of the cost and the kind and the shape of the hoop member are not restricted.

For the spiral wound type gasket according to the present invention, from the point of view of the construction, the fundamental form is most preferable for decreasing the weight. However the form may be a spiral wound type gasket with an outer ring without any inconvenience.

BRIEF DESCRIPTION OF THE DRAWINGS

FIGS. 4A and 4B are schematical diagrams showing a principal part of an equipment for fabricating gaskets according to the embodiment of the present invention;

FIG. 5 is a transversal cross-sectional view showing an example of use state of the embodiment of the present invention; and FIG. 6 is a transversal cross-sectional view showing an example of use state of a prior art spiral wound type gasket.

DETAILED DESCRIPTION OF THE INVENTION

Figure 1:
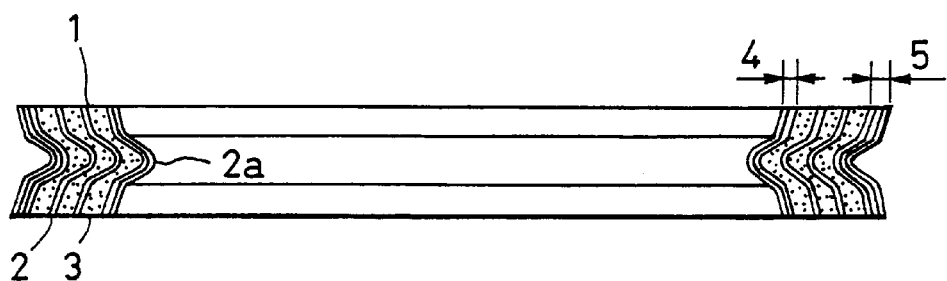
FIG. 1 is a transversal cross-sectional view of an embodiment of the present invention.
Figure 2:
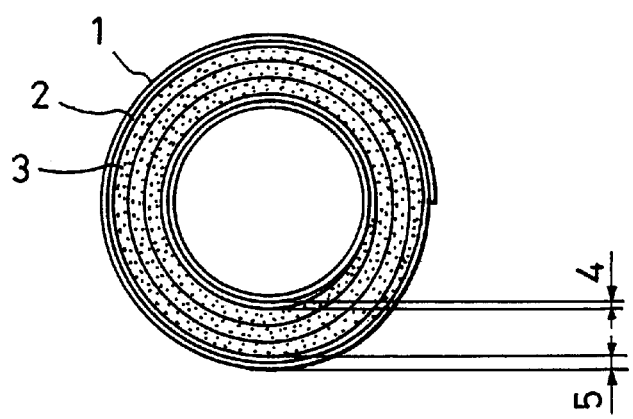
FIG. 2 is a plan view of the embodiment of the present invention.
Figure 3:
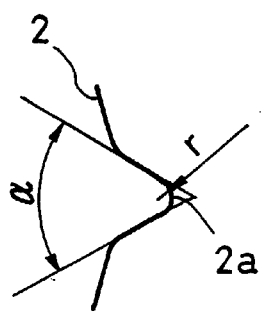
FIG. 3 is an enlarged cross-sectional view of an extremity bent portion of a hoop member indicated in FIG. 1.

The present invention can be constructed e.g. as indicated in FIGS. 1 to 3. A spiral wound type gasket 1 is constructed by winding a metal hoop member 2 and a filler member 3 in a spiral, superposing them on each other, directing an extremity bent portion 2a of a V shape of the hoop member 2 towards the inner peripheral side. The extremity bent portion 2a preferably has an angle α comprised between 30° and 90°; and a radius of curvature r between 0.4 mm and 1.3 mm.

According to the present invention, the extremity bent portion 2a of the approximate V shape of the hoop member 2 of the gasket body protrudes from the inner periphery thereof and the extremity of the innermost periphery is brought into contact with an in-row portion of an exhaust pipe. The gasket is circumscribed about the exhaust pipe. The gasket 1 does not catch the pipe when inserted. The gasket body does not bulge out towards the interior of the pipe. Centering can be easily effected, and fall-out of the filler member 3 can be prevented, because the filler member 3 is not exposed to exhaust gas, and a sealing property can be held for a long period of time.

In order that the filler member 3 is not in contact with exhaust gas, it has been proved by results of a study by the inventors of the present invention that the angle α is necessarily smaller than 90° in general in addition to the fact that the extremity bent portion 2a of the approximate V shape of the hoop member is directed towards the inner peripheral side. They have found that the amount of compression at a low superficial pressure increases with decreasing angle α, but when it is too small, the amount of compression becomes too great so that buckling takes place and that workability at winding is worsened. In the present invention, a region of the angle α of the extremity bent portion 2a of the approximate V shape of the hoop member 2 most suitable for increasing the amount of compression at a low superficial pressure is clarified.

Further, since the extremity bent portion 2a of the approximate V shape of the hoop member 2 is directed towards the inner peripheral side and the angle α is smaller than that of usual spiral wound type gaskets, the magnitude of the radius of curvature r is also important. When it is smaller than 0.4 mm, the filler member 3 cannot be inserted well into the extremity bent portion 2a of the hoop member 2a. Further, when the radius of curvature is too small, the hoop member 2 can be broken. On the other hand, when the radius of curvature r is great, the amount of compression at a low superficial pressure is great and a good sealing property is held.

However, when the radius of curvature is greater than 1.3 mm, the amount of compression becomes too great so that buckling takes place and the sealing property is worsened.

Now the present invention will be explained in more detail by using several embodiments.

In the different embodiments, the spiral wound type gaskets are constructed as indicated in FIGS. 1 to 3. FIG. 4 shows an embodiment of a method for fabricating spiral wound type gaskets.

EMBODIMENT 1

In EMBODIMENT 1, the extremity bent portion 2a of the approximate V shape of the hoop member 2 in a fundamental type gasket having an inner diameter of 50 mm, an outer diameter of 63 mm and a thickness of 4.8 mm, in which an NA tape is used for the filler member 3, protrudes towards the inner peripheral side.

As a method for fabricating the spiral wound type gasket, a tape-shaped thin plate made of SUS 304 used for the hoop member 2 is worked into an approximate V shape by dishing so that the angle α of the extremity bent portion 2a is 45° and the radius of curvature r is 0.9 mm. The thin plate is set on a winding die 6 with a groove 6a having a same shape in cross section as the approximate V shape of the hoop member 2, as indicated in FIG. 4A. After having wound the hoop member 2 by one turn while applying a pressure thereto by means of a thrusting piece 8 having a shape just opposite to the winding die 6, it is fastened by point welding to form an inner peripheral idly wound portion 4. Thereafter, putting the filler member 3 made of NA tape between two adjacent plies of the hoop member 2, they are wound, superposing filler members 3 and the hoop members 2 on each other. Subsequently only the hoop member 2 is idly wound again by one turn without filler member and fastened by point welding to form an outer peripheral idly wound portion 5 in order to complete the spiral wound type gasket 1. Finally, the upper part 7 of the winding die 6, divided into two parts in the thickness direction, is removed and the gasket 1 is taken out.

EMBODIMENT 2

In EMBODIMENT 2, a spiral wound type gasket 1 is fabricated in approximately the same manner as in EMBODIMENT 1. However the angle α of the extremity bent portion 2a of the hoop member 2 in EMBODIMENT 1 is changed to 35° and the radius of curvature r thereof is changed to 1.2 mm.

EMBODIMENT 3

In EMBODIMENT 3, a spiral wound type gasket 1 is fabricated in an approximately same manner as in EMBODIMENT 1. However, the angle α of the extremity bent portion 2a of the hoop member 2 in EMBODIMENT 1 is changed to 60° and the radius of curvature r thereof is changed to 0.6 mm.

EXAMPLE FOR COMPARISON 1

COMPARISON 1 is the usual spiral wound type gasket fabricated in approximately the same manner as in EMBODIMENT 1, apart from the fact that the extremity bent portion 2a of the approximate V shape of the hoop 2 is directed towards the outer peripheral side, so that the sealing part, which is in contact with a flange, has a same diameter as the latter, in which the angle α of the extremity bent portion 2a is 60° and the radius of curvature r thereof is 0.6 mm.

EXAMPLE FOR COMPARISON 2

COMPARISON 2 is a spiral wound type gasket fabricated in approximately the same manner as in EMBODIMENT 1, in which the angle α of the extremity bent portion 2a of the hoop member directed towards the inner peripheral side is changed to 25° and the radius of curvature r thereof is changed to 1.4 mm.

EXAMPLE FOR COMPARISON 3

COMPARISON 3 is a spiral wound type gasket fabricated in approximately the same manner as in EMBODIMENT 1, in which the angle α of the extremity bent portion 2a of the hoop member directed towards the inner peripheral side is changed to 100° and the radius of curvature r thereof is changed to 0.3 mm.

EXAMPLES FOR COMPARISON 2 and 3 are not prior art gaskets, but they are prepared specifically for comparing characteristics thereof with those of the embodiments of the present invention.

TABLE 1 shows the construction of EMBODIMENTS 1 to 3 as well as EXAMPLES FOR COMPARISON 1 to 3 and results obtained on the centering property, the amount of compression and the sealing property thereof. The centering property was judged by inserting the gasket into the in-row portion and by measuring the magnitude of play. In compression tests object gaskets were compressed by means of a press testing apparatus and the amount of compression was measured at a superficial pressure of 200 kgf/cm$^2$. In sealing tests, putting a gasket between two flanges, which were fastened with a superficial pressure of 200 kgf/cm$^2$, the pressure in the interior of the flanges was then increased with air and the quantity of leaked air was measured at an inner pressure of 3 kgf/cm$^2$ by means of a flow meter.

It can be seen from TABLE 1 that the spiral wound type gaskets, according to the embodiments of the present invention, have a better centering property, a greater amount of compression and a better sealing property than those according to the examples for comparison.

TABLE 1

|  | EMBODIMENT 1 | EMBODIMENT 2 | EMBODIMENT 3 | EXAMPLE FOR COMPARISON 1 | EXAMPLE FOR COMPARISON 2 | EXAMPLE FOR COMPARISON 3 |
| --- | --- | --- | --- | --- | --- | --- |
| DIRECTION OF V SHAPE OF HOOP MEMBER | INWARD | ← | ← | OUTWARD | INWARD | ← |
| ANGLE α (°) | 45 | 35 | 60 | 60 | 25 | 100 |
| RADIUS OF CURVATURE r (mm) | 0.9 | 1.2 | 0.6 | 0.6 | 1.4 | 0.3 |
| CENTERING PROPERTY | GOOD | GOOD | GOOD | BAD | GOOD | BAD |
| AMOUNT OF COMPRESSION (mm) | 1.4 | 1.6 | 1.1 | 0.9 | 1.8 | 0.7 |
| SEALING PROPERTY (cc/min) | 3 | 4 | 6 | 10 | 12 | 15 |

In use, the spiral wound type gasket 1, constructed according to the present invention, is inserted into the in-row portion 11 between the upstream side flange 9 and the downward side flange 10 of the exhaust pipe, e.g. as indicated in FIG. 5. The extremity bent portion 2a of the approximate V shape of the hoop member 2 of the gasket body protrudes towards the inner peripheral side and the extremity of the innermost portion thereof is brought into contact with the in-row portion 11 and is circumscribed therebout so that the filler member 3 is not exposed directly to exhaust gas. Therefore, fall out does not take place and a good sealing property can hold for a long period of time.

As clearly seen from the above explanation, by using the spiral wound type gasket according to the present invention, it is possible to prevent bulge-out of the gasket body towards the interior of the pipe without damaging fitness of the gasket with respect thereto. This is because the extremity bent portion of the approximate V shape of the hoop of the gasket body protrudes towards the inner peripheral side to avoid fall-out of the gasket body and to maintain an initial sealing property over a long period of time.

Particularly, using a radius of curvature r of the extremity bent portion of the approximate V shape of the hoop member of between 0.4 mm to 1.3 mm and an angle α of the extremity bent portion between 30° and 90°, it is possible to obtain a great amount of compression and a good sealing property.

What is claimed is:

1. A spiral wound type gasket inserted into an in-row portion between an upstream side flange and a downstream side flange of an exhaust pipe, the spiral wound type gasket including, a metal hoop member having an approximate V shape in cross section and a filler member wound in a spiral while superposed on the metal hoop member, wherein an extremity bent portion of the V shape of the hoop member protrudes towards an inner peripheral side, the extremity of the innermost portion of the bent portion is brought into contact with the in-row portion so that the filler member is not exposed to exhaust gas in the pipe, and the extremity bent portion has an angle between 30° and 90°.

2. A spiral wound type gasket according to claim 1, wherein said extremity bent portion has a radius of curvature comprised between 0.4 mm and 1.3 mm.

3. A spiral wound gasket according to claim 1, wherein said metal hoop member comprises a single undulated tape-shaped metal plate before winding.

4. A joint portion of a piping comprising:
an upstream side flange;
a downstream side flange, an in-row portion between said upstream side flange and said downstream side flange; and
a spiral wound type gasket inserted into the in-row portion, said spiral wound type gasket comprising:
a metal hoop member including an extremity bent portion having an approximate V shape in cross section, the extremity bent portion protruding inwardly about an inner peripheral side of said spiral wound type gasket; and
a filler member, said metal hoop member and said filler member being wound in a spiral while superposed on each other;

wherein said extremity bent portion of said metal hoop member contacts the in-row portion so that said filler member is not exposed to gas in said piping.

5. The joint portion of the piping of claim 4, wherein said piping comprises an exhaust pipe and the gas comprises exhaust gas.

6. The joint portion of claim 4, wherein said extremity bent portion of said spiral wound type gasket has an angle between 30 degrees and 90 degrees.

7. The joint portion of claim 4, wherein said extremity bent portion has a radius of curvature between 0.4 mm and 1.3 mm.

8. The joint portion of claim 4, wherein said metal hoop member comprises a single undulated tape-shaped metal plate before winding.

9. A spiral wound type gasket for insertion into an in-row portion between an upstream side flange and a downstream side flange of an exhaust pipe, said spiral wound type gasket comprising:
a metal hoop member comprising a single undulated tape-shaped metal plate including an extremity bent portion protruding toward an inner peripheral side of said gasket and having an approximate V shape when viewed in cross section, said extremity bent portion having a radius of curvature between 0.4 mm and 1.3 mm and an angle between 30 degrees and 90 degrees; and
a filler member, said filler member and said metal hoop member having been wound in a spiral while superposed on each other to form said spiral wound type gasket.

10. The spiral wound type gasket of claim 9, said extremity bent portion having an angle of 35 degrees.

11. The spiral wound type gasket of claim 1, said extremity bent portion having a radius of curvature of 1.4 mm.

12. The spiral wound type gasket of claim 9, said extremity bent portion having a radius of curvature of 1.2 mm.

13. The spiral wound type gasket of claim 12, said extremity bent portion having an angle of 35 degrees.

14. The joint portion of claim 4, said extremity bent portion having an angle of 25 degrees.

15. The joint portion of claim 14, said extremity bent portion having a radius of curvature of 1.4 mm.

* * * * *